United States Patent
Gailloux et al.

(10) Patent No.: US 10,628,827 B1
(45) Date of Patent: Apr. 21, 2020

(54) ELECTRONIC COMMERCE FRAUD MITIGATION IN A WIRELESS COMMUNICATION NETWORK

(71) Applicant: Sprint Communications Company L.P., Overland Park, KS (US)

(72) Inventors: Michael A. Gailloux, Overland Park, KS (US); Adam C. Pickett, Prairie Village, KS (US); Vanessa L. Suwak, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 357 days.

(21) Appl. No.: 15/591,094

(22) Filed: May 9, 2017

(51) Int. Cl.
- *G06Q 20/00* (2012.01)
- *G06Q 20/30* (2012.01)
- *G06Q 20/40* (2012.01)
- *G06Q 20/32* (2012.01)

(52) U.S. Cl.
CPC ....... *G06Q 20/4016* (2013.01); *G06Q 20/327* (2013.01); *G06Q 20/3226* (2013.01)

(58) Field of Classification Search
CPC .............................. G06F 21/316; H04W 12/12
USPC ........................................................ 705/44
See application file for complete search history.

(56) References Cited

U.S. PATENT DOCUMENTS

| | | | |
|---|---|---|---|
| 9,438,631 B2 * | 9/2016 | Bettini | H04W 12/12 |
| 9,959,399 B2 * | 5/2018 | Su | G06F 21/316 |
| 2016/0267513 A1 | 9/2016 | Walz et al. | |

* cited by examiner

*Primary Examiner* — Clifford B Madamba

(57) ABSTRACT

A mobile communication device. The device comprises a cellular radio transceiver, a short range radio transceiver, a processor, a memory, and an electronic commerce mobile application stored in the memory. When executed by the processor, the electronic commerce mobile application determines an inventory of mobile applications of the device, transmits the inventory via one of the radio transceivers to a security server application executing on a computer system external to the mobile communication device, and detects when the device enters a retail store associated with the electronic commerce mobile application. The electronic commerce mobile application further, responsive to detecting entrance to the retail store, transmits a request for a security risk score to the security server application executing on the computer system external to the device, and implements an escalated level of security check during a payment transaction conducted based on a received security risk score exceeding a predefined threshold.

18 Claims, 6 Drawing Sheets

US 10,628,827 B1

ELECTRONIC COMMERCE FRAUD MITIGATION IN A WIRELESS COMMUNICATION NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be used to conduct electronic commerce. For example, an electronic commerce mobile application may be installed on a mobile communication device, for example a department store credit card mobile application, and used to complete payment transactions. While electronic commerce conducted using mobile communication devices can increase commerce, possibly enlivening the national economy, and make life more convenient for users of mobile communication devices, this capability can also be misused for perpetrating various forms of electronic commerce fraud, for example identity theft. Increasingly credit card institutions and retail enterprises are calling upon wireless communication service providers to take steps to mitigate electronic commerce fraud using mobile communication devices.

SUMMARY

In an embodiment, a mobile communication device is disclosed. The mobile communication device comprises a cellular radio transceiver, a short range radio transceiver, a processor, a non-transitory memory, and an electronic commerce mobile application stored in the non-transitory memory. When executed by the processor, the electronic commerce mobile application, during installation of the electronic commerce mobile application, determines an inventory of installed mobile applications of the mobile communication device, transmits the inventory of installed mobile applications via one of the cellular radio transceiver or the short range radio transceiver to a security server application executing on a computer system external to the mobile communication device, and detects when the mobile communication device enters a retail store associated with the electronic commerce mobile application. The electronic commerce mobile application further, responsive to detecting entrance to the retail store, transmits a request for a security risk score to the security server application executing on the computer system external to the mobile communication device, implements an escalated level of security check during a payment transaction conducted based on a received security risk score exceeding a predefined threshold.

In another embodiment, a method of electronic commerce using a mobile communication device is disclosed. The method comprises initializing installation of an electronic commerce mobile application on the mobile communication device, determining by the electronic commerce mobile application an inventory of hardware components of the mobile communication device, and transmitting by the electronic commerce mobile application the inventory of hardware components of the mobile communication device to a security server application executing on a computer system external to the mobile communication device. The method further comprises detecting that the mobile communication device has entered a retail store associated with the electronic commerce mobile application, after detecting the device entering the store, transmitting a request for a security risk score to the security server application executing on the computer system external to the mobile communication device, receiving a security risk score, and, based on the received security risk score, presenting a prompt to input user credentials during a payment transaction, where the prompt to input user credentials comprises an escalated level of transaction security.

In yet another embodiment, an electronic commerce security computer system is disclosed. The system comprises at least one processor, at least one non-transitory memory, a data store comprising information about the hardware components and the installed mobile applications on mobile communication devices, and a security application stored in the at least one non-transitory memory. When executed by the at least one processor, the security application receives a message from an electronic commerce mobile application installed on a mobile communication device comprising an inventory of hardware components of the mobile communication device and of installed mobile applications of the mobile communication device, after receiving the message from the electronic commerce mobile application comprising the inventory, reads information about the hardware components and the installed mobile applications on the mobile communication device from which the message containing the inventory was received, compares the inventory sent by the electronic commerce mobile application to the information read about the hardware components and the installed mobile applications on the mobile communication device read from the data store, and takes an action to reduce fraud using the electronic commerce mobile application installed on the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
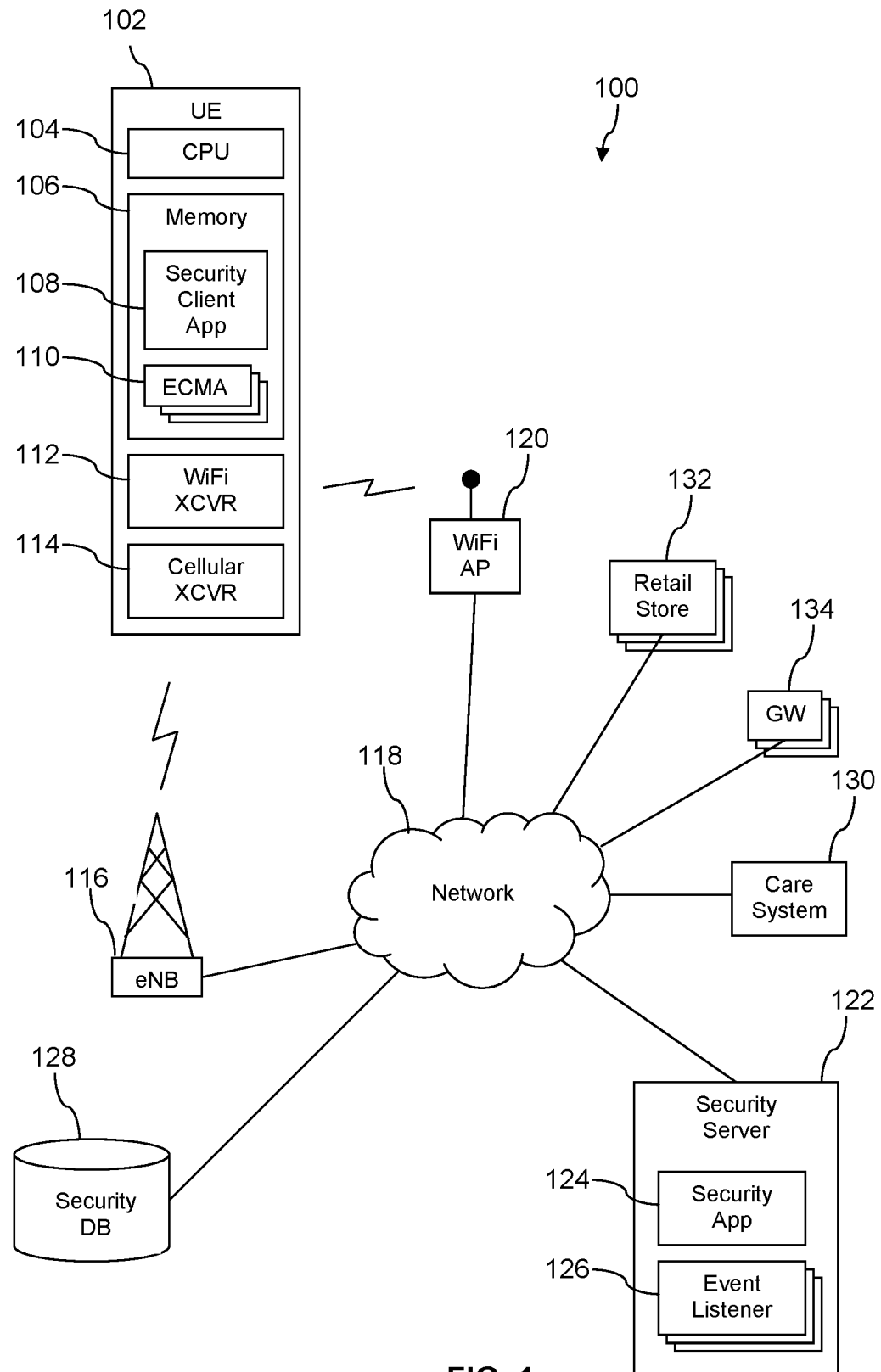
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for mitigating electronic commerce fraud perpetrated using mobile communication devices. Electronic commerce mobile applications (ECMAs) may be built using a software development kit (SDK) that automatically incorporates fraud mitigation protocols into the subject electronic commerce mobile applications. For example, an electronic commerce mobile application that is associated with a major department store embeds an installation protocol that, when the application is downloaded to a mobile communication device for installation, determines an inventory of hardware components of the mobile communication device, determines an inventory of mobile applications installed on the mobile communication device, determines an inventory of IP addresses of WiFi access points stored by the mobile communication device, determines an inventory of IP addresses the mobile communication device has most recently connected to (e.g., the three most recently connected to IP addresses, the five most recently connected to IP addresses, or some other number), and transmits this inventory information back to a security application executing on a security server in a wireless communication service provider domain (or other entity's domain).

The security application executing on the security server then compares this inventory reported by the electronic commerce mobile application while being installed to a previous history associated with the mobile communication device, for example a lost or stolen status of the device and/or a hardware and software inventory of the device. The security application can also compare the IP addresses of WiFi access points stored on the mobile communication device to black listed or watch listed IP addresses (e.g., IP addresses that are suspected of being engaged in cybercrime). The security application can also compare the most recently connected to IP addresses to black listed or watch listed IP addresses. If the comparison indicates a heightened security risk, the security application may take a number of actions to mitigate the security risk. It may place the mobile communication device on a black list and promulgate that black listing recommendation to other security promoting entities, such as competing wireless communication service providers, the department store associated with the electronic commerce mobile application, and others. It may prompt the user of the device to provide additional authentication, for example to provide a personal identification number (PIN), to provide a biometric, to provide a password. It may cause the ECMA to be disabled on the device until the user contacts the issuer of the ECMA to request restoration of services.

Once installed, the electronic commerce mobile application may determine when the mobile communication device has entered a retail store of or some other building associated with the subject commercial entity (e.g., a store of the department store enterprise) and initiate risk assessment in advance of and in anticipation of use of the electronic commerce mobile application installed on the mobile communication device to complete a payment transaction. As part of the risk assessment, the electronic commerce mobile application may confirm the persistence of a security client application installed on the mobile communication device and report the presence or absence of the security client application to the security application executing on the security server. The electronic commerce mobile application may request the security application to begin the risk assessment, or the electronic commerce mobile application may instead send a message to an application executing on a computer system in the subject commercial enterprise that supports the electronic commerce mobile application (e.g., a department store enterprise), and the computer system in the commercial enterprise may send a risk assessment request to the security application. The risk assessment result may be used by the electronic commerce mobile application and/or the commerce enterprise to request the mobile communication device to provide additional security credentials, such as input a security PIN or present a personal identity card such as a driver's license at the point of sale terminal to be verified by a clerk or other.

A variety of sources of information are monitored by the security application or event listeners associated with the security server. The inventory reports of electronic commerce mobile applications being installed on mobile communication devices is monitored. Also, communication gateways may sniff data packets and detect mobile application installations into mobile communication devices and report this activity to the security application or event listeners. The security application may detect a pattern of activity that signals increased risks of electronic commerce fraud and may elevate risk mitigation procedures for the associated mobile communication device to different levels. Different levels of risk mitigation procedures may be associated with performing more or different risk mitigation algorithms and/or performing risk mitigation algorithms more frequently.

As an example, loading a plurality of mobile applications on a mobile communication device during a compressed period of time, where the mobile applications are associated with a high probability of electronic commerce fraud, can be predefined as a pattern of events that triggers specific security protocols. For example, loading a plurality of different banking mobile applications on the mobile communication device within a short duration of time may be an anomalous triggering pattern.

A list of trigger events that lead to applying distinctive security protocols can be defined and provided to the security application. Other events of interest can be reports of a mobile communication device being lost or stolen, relayed from a customer care system, setting a forwarding flag for the mobile communication device, changing a password of the mobile communication device, addition of international long distance service to a wireless communication service account. It is understood that one of these events in isolation may be insignificant but in combinations such events may be highly correlated with preparing a mobile communication device for committing electronic commerce fraud. Some of these trigger events in isolation may be insignificant but in combination with other trigger events may be highly correlated with preparing the mobile communication device to be operated as a platform for electronic commerce fraud.

The present disclosure teaches a system and methods that can reduce the response time for addressing commerce fraud from days to hours, reducing much of the damage caused by such electronic commerce fraud and possibly foiling some of the electronic commerce fraud before it starts. Said in another way, the system uses real-time and historical information to automatically determine if a human being should be notified and tasked with evaluating whether electronic commerce fraud may be taking place and intervene to thwart the fraud. In some cases, the system, in addition to notifying the human being, takes automated action to stop fraud. It will be appreciated that the system may be installed on a large number of mobile communication devices, for example more than a million mobile communication devices or more than ten million mobile communication devices. The supervision of this many devices to evaluate a fraud risk of each device in real-time inherently poses a significant information technology (IT) challenge or computing challenge. The present disclosure teaches at least one computer implementation of an electronic fraud mitigation system, but it is understood that the ideas of the present disclosure can be applied to other implementations that are not explicitly described herein.

Turning now to FIG. 1, a communication system 100 is described. In an embodiment, the system 100 comprises a plurality of user equipments (UEs) 102, a plurality of cell sites 116, a network 118, a plurality of short-range radio access points (APs) 120, a security server 122, a security data store 128, a customer care system 130, a plurality of retail stores 132, and a plurality of communication gateways 134. The network 118 may be one or more public network, one or more private network, or a combination thereof. The cell site 116 may be referred to in some contexts as an enhanced node B (eNB), a base transceiver station (BTS), a cell tower, or some other name. The cell site 116 may provide a wireless communication link to the UE 102 according to a long term evolution (LTE), a code division multiple access (CDMA), a global system for mobile communication (GSM), a worldwide interoperability for microwave access (WiMAX), or other wireless communication protocol. The UEs 102 may be referred to as mobile communication devices in some contexts herein. The UEs 102 may comprise any mix of mobile phones, smart phones, personal digital assistants (PDAs), media players, wearable computers, headset computers, laptop computers, tablet computers, or notebook computers.

In an embodiment, the UE 102 comprises a processor 104, a memory 106, a short-range radio transceiver 112, and a cellular radio transceiver 114. The memory may store a security client application 108 and one or more electronic commerce mobile applications (ECMAs) 110. In an embodiment, the security client application 108 and the ECMAs 110 may be stored in a non-transitory memory portion of the memory 106. The cellular radio transceiver 114 may be configured to establish wireless communication links with the cell site 116 according to one or more of the LTE, CDMA, GSM, or WiMAX protocols. The cellular radio transceiver 114 may be distinguished from the short-range radio transceiver 112 by its greater maximum radio communication range, as well as based on other distinctions. For example, the short-range radio transceiver 112 may have a maximum range of about 1000 feet or less while the cellular radio transceiver 114 may have a maximum range of several miles, for example a maximum range of about 5 miles, about 10 miles, or about 15 miles. In an embodiment, the short-range radio transceiver 112 is a WiFi radio transceiver, and the short-range AP 120 is a WiFi access point.

An ECMA 110 may be created with a software development kit (SDK) that is provided by a wireless communication service provider, for example as a condition for downloading the ECMA 110 into a UE 102 that receives wireless communication service from the subject service provider, as a means of securing the UE 102 as well as a radio access network (RAN) and the network 118. The ECMA 110 may be developed by an enterprise such as a department store enterprise or other business or by a third party application developer engaged by the enterprise. The ECMA 110 may provide an electronic credit card associated with the enterprise and a marketing functionality that may provide notifications of promotions and may manage a loyalty program associated with the enterprise. In addition to the desired functionality for supporting electronic commerce, the ECMA 110 may incorporate security algorithms, protocols, and procedures mandated by the wireless service provider and automatically built into the ECMA 110 when building the ECMA 110 using the SDK.

One of the procedures of the ECMA 110 may be conducting an inventory of the UE 102 hardware and software on the event of installation of the ECMA 110 on the UE 102. By linking this inventory procedure with event of installation of the ECMA 110, a security check can be made at a time when the UE 102 is being loaded up with mobile applications in preparation for committing fraud and this may promote limiting the impact of such fraud or even stopping the fraud dead in its tracks before it starts. In an embodiment, the ECMA 110 may conduct an inventory of the UE 102 hardware but not of the software. Alternatively, in an embodiment, the ECMA 110 may conduct an inventory of the UE 102 software but not of the hardware. While an inventory that comprises information on both hardware and software may be preferred, at least some of the fraud mitigation functionality of system 100 could be provided without both.

The inventory procedure can involve making calls to an operating system of the UE 102 and/or making calls to the security client application 108. This inventory can record version numbers and installation dates of hardware components of the UE 102 (e.g., a SIM card or other removable identification module) and version numbers and installation dates of software components. The software components may include mobile applications installed on the UE 102, for example mobile applications installed on the UE 102 after manufacturing by an end user of the UE 102. It is understood that the inventory of software components may include the security client application 108 itself. This check may help detect an attempt to disable or bypass the security client application 108 pursuant to committing fraud using the UE 102.

The inventory procedure can also determine an inventory of IP addresses of WiFi access points stored in the memory 106. The inventory procedure can also determine a set of most recently connected to IP addresses. After completing the inventory, the ECMA 110 may report the inventory back to a security application 124 executing on the security server 122. This information can serve as a historic baseline for future comparison and may be stored in the security data store 128.

Further, the security application 124 may compare this inventory against earlier stored inventory for this UE 102. If an anomalous difference is found between the previous inventory and the current inventory, the security application 124 may take action to increase security scrutiny on the UE 102 and/or on the ECMA 110. Additionally, the security application 124 can compare the list of IP addresses of WiFi access points and the list of most recently visited IP addresses to a black list or watch list of IP addresses. If any of these IP addresses is found on a black list or watch list, the security application 124 may take action to increase security scrutiny on the UE 102. In an embodiment, the security application 124 can send the IP addresses of the WiFi access points and the list of most recently visited IP addresses to a third party to request that an evaluation as to whether there is known electronic commerce fraud associated with any of those IP addresses be conducted and the result of the evaluation be returned to the security application 124. This third party may be able to indicate that the connection point of that IP address originates out of a certain country, a certain region, or a certain area that has a heightened history of electronic commerce fraud. This evaluation can support the determination that an elevated risk of electronic commerce fraud is associated with the subject UE 102.

It is contemplated that a variety of different levels of security scrutiny can be applied by the system 100. As an example, a security action can include black listing the UE 102 and/or the ECMA 110 in the wireless communication service provider's domain, sharing the black listing with collaborating security entities outside of the wireless service provider domain (e.g., other wireless service providers, other electronic security clearing houses or organizations). A security action can include asking a user associated with the UE 102 to provide an independent form of identity corroboration (PIN, driver's license, other personal identification) at a point-of-sale terminal. A security action can include contacting a user associated with the UE 102 through an out-of-band communication channel, for example via a phone call to a different phone such as to a work phone, via an email message. A security action can include temporarily suspending the effectivity of the ECMA 110 for a predetermined period of time, for example for 8 hours or some other duration of time. A security action can include suspending the effectivity of the ECMA 110 indefinitely until the user contacts the enterprise issuer of the ECMA 110 via a different communication device. These various security actions may be taken in other circumstances not just when an inventory anomaly is noted on initial installation of the ECMA 110.

The security application 124 may periodically perform a variety of security checks on UEs 102. The security application 124 may evaluate those UEs 102 that are associated with elevated security risk scores more frequently and may perform different and/or additional security risk evaluation procedures for these different levels of risk. In an embodiment, UEs 102 may be associated with three different risk tiers, where each risk tier is associated with a frequency of evaluation and a set of risk assessment procedures to be performed. In another embodiment, a different number of risk tiers may be employed.

The security client application 108 may determine when the UE 102 is communicatively coupled to an AP 120 and report an IP address or other identifying information about the AP 120 back to the security application 124 or to one of a plurality of event listeners 126. The security application 124 may use this report to check the IP address of the AP 120 against a black list of dubious communication nodes. For example, the AP 120 may be associated with electronic commerce fraud, and identifying attachment of the UE 102 to that AP 120 may be used to foil electronic commerce fraud attempts. The security client application 108 may periodically send a status message to the security application 124 that indicates that the security client application 108 remains in active service and is able to communicate.

The security client application 108 may periodically perform the inventory procedure on hardware components, software components, IP addresses of WiFi access points, and IP addresses most recently connected to and transmit this inventory information back to the security application 124 for storage in the security data store 128 and for evaluation. For example, the security client application 108 may perform the inventory procedure once per week, once per month, once per quarter, or on some other periodic basis. The security client application 108 may perform the inventory procedure in response to specific triggering events, such as on the event of a change to a feature of a wireless communication service subscription features. In an embodiment, the security application 124 may command the security client application 108 to perform the inventory procedure and report inventory information back to it.

In an embodiment, the installation procedure of the ECMA 110 may further entail handshaking with the security client application 108, whereby to assure that the security client application 108 has not been disabled during a device rooting attack or other attempt to defeat the security infrastructure of the UE 102. This may be referred to as verifying the function of the security client application 108. If the security client application 108 is disabled or has been corrupted, the installation procedure of the ECMA 110 may not be completed and a message reporting the failed handshaking with the security client application 108 may be reported back to the security application 124 for taking action. The security application 124 may store the information in the security data store 128 and set a security processing level for the UE 102 accordingly. Additionally, when the ECMA 110 is engaged to make ready for a possible payment transaction or is actually engaged in a point-of-sale transaction, the ECMA 110 may handshake with the security client application 108 to assure the security client application 108 has not been disabled. This may be referred to as verifying the function of the security client application 108. If the security client application 108 has been disabled, it may report this information to a point-of-sale terminal, to the security application 124, to an enterprise associated with the ECMA 110, and/or to another entity. Further, when the ECMA 110 finds the security client application 108 has been disabled, it may block any attempts to complete a payment transaction using the ECMA 110.

When the UE 102 determines that it has entered a retail store 132 associated with the ECMA 110 (the ECMA 110 may comprise a list of GPS latitude/longitude location references for each of a plurality of retail locations and/or may have a list of wireless beacon references that can be used to identity retail locations and/or may have a list of WiFi access point IP addresses that can be used to identify retail locations), the ECMA 110 may communicate to the security application 124 or to a credit card institution associated with the electronic commerce mobile application to determine a risk score associated with completing a payment transaction by the ECMA 110 at the retail store 132. The ECMA 110 may send a message identifying the UE 102 and/or the serial number or credit card number associated with the subject ECMA 110. The ECMA 110 may send current contextual information such as the identity of the retail store 132 and/or a fresh capturing of inventory information as described above. In an embodiment, anytime the ECMA 110 is launched on the UE 102 (e.g., in preparation for use in an on-line electronic commerce payment transaction outside of a retail store 132) it may perform a variety of security checks and report back to the security application 124 as described above, for example determining health and/or presence of the security client application 108, inventory, and/or IP addresses. It is understood that the UE 102 may determine that it has entered a building or location, other than a retail store 132, associated with the ECMA 110. In some contexts, the UE 102 may be said to detect or determine when the UE 102 enters a location associated with the ECMA 110.

The security application 124 can evaluate the risk on a scale of 0 to 1, 0 to 10, 1 to 10, or some other scale. The security application 124 can evaluate the risk based on information available to it about the ECMA 110 and the UE 102 associated to the subject inquiry but also based on information available to it about recent trends of cybercrime and patterns of electronic commerce fraud. An enterprise or credit card institution associated with the ECMA 110 may request the risk assessment, for example periodically or on the event of the UE 102 entering a retail store 132 or other location associated with the enterprise. The risk assessment may be requested to be performed at different tranches of thoroughness based on preference of the enterprise. For example, the enterprise may wish to do a full check at least once per year but not do a full security check on every payment transaction.

The security application 124 may be tipped off about security related events by one or more event listeners 126. The event listeners 126 may execute on the security server 122 and may listen for events spawned by other systems. For example a first event listener 126 may listen for events spawned by a customer care system 130, for example setting lost or stolen flags by the customer care system 130 in a billing system data store in response to subscribers reporting their phones lost. For example, a second event listener 126 may listen for events spawned by gateways 134 when mobile applications are installed into UEs 102. It is understood that in an alternative embodiment, the event listeners 126 may execute remotely and report back to the security application 124, for example the first event listener 126 executing at the care system 130 or at a data store coupled to the care system 130 (e.g., a database trigger could be considered to be an event listener), and the second event listener 126 executing at the gateways 134. The event listeners 126 may store notifications or logs of the events they detect on a task processing queue on the security server 122 that the security application 124 processes as it has time.

In an embodiment, the security application 124 may execute a plurality of different security evaluation loops, each loop executing at a different frequency. Depending on the perceived security risk associated with UEs 102, some UEs 102 may be evaluated by a first slow executing loop, other UEs 102 at a more elevated risk may be evaluated by a second more frequently executing loop, and other UEs 102 at the highest risk may be evaluated by a third most frequently executed loop.

Figure 2:
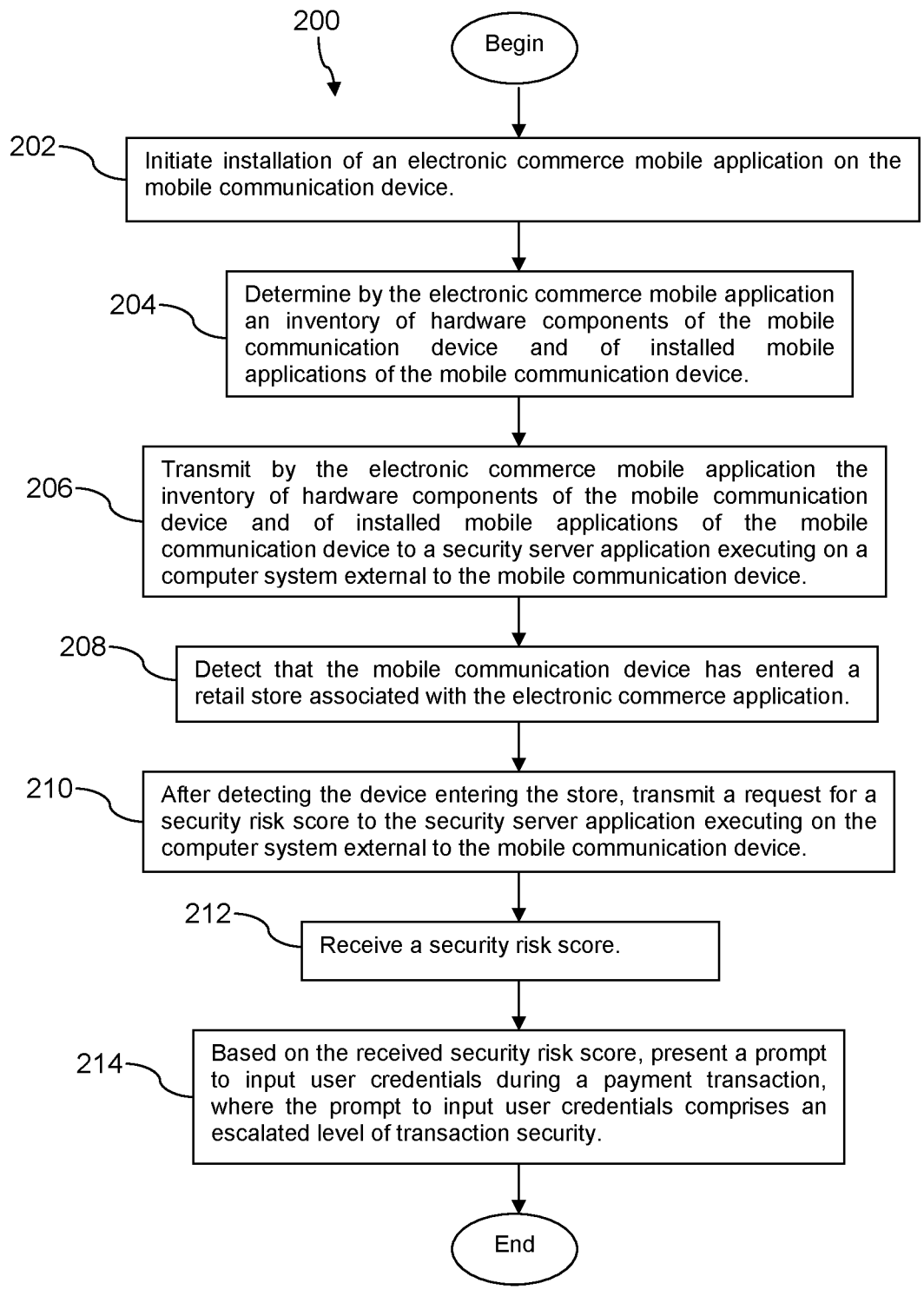
FIG. 2 is a flow chart of a method according to an embodiment of the disclosure.

Turning now to FIG. 2, a method 200 is described. At block 202, initiate installation of an electronic commerce mobile application on the mobile communication device. At block 204, determine by the electronic commerce mobile application an inventory of hardware components of the mobile communication device and of installed mobile applications of the mobile communication device. In an embodiment, the processing of block 204 may determine the inventory of hardware components of the device and not determine what mobile applications are installed on the device. Alternatively, in an embodiment, the processing of block 204 may determine an inventory of the mobile applications installed on the device but not determine what hardware components are in the device. At block 206, transmit by the electronic commerce mobile application the inventory of hardware components of the mobile communication device and of installed mobile applications of the mobile communication device to a security server application executing on a computer system external to the mobile communication device. At block 208, detect that the mobile communication device has entered a retail store or other location associated with the electronic commerce mobile application. At block 210, after detecting the device entering the store, transmit a request for a security risk score to the security server application executing on the computer system external to the mobile communication device. At block 212, receive a security risk score. At block 214, based on the received security risk score, present a prompt to input user credentials during a payment transaction, where the prompt to input user credentials comprises an escalated level of transaction security.

Figure 3:
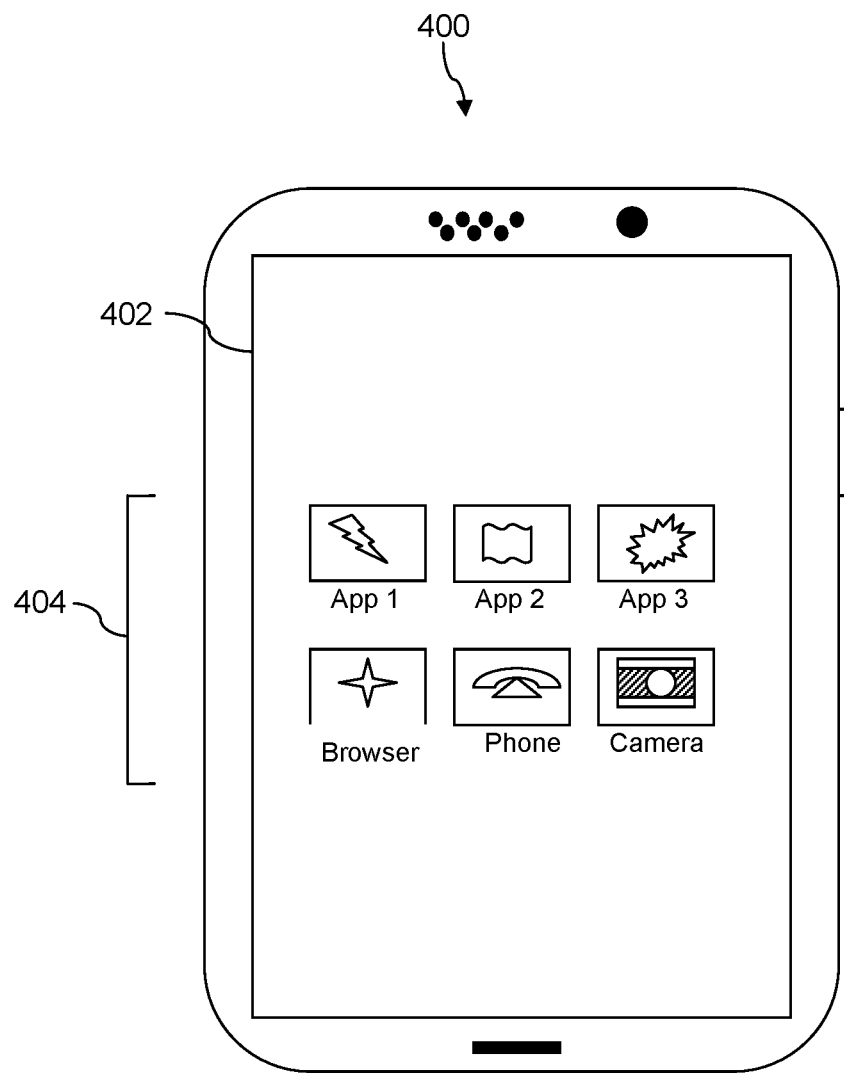
FIG. 3 is an illustration of a mobile communication device according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
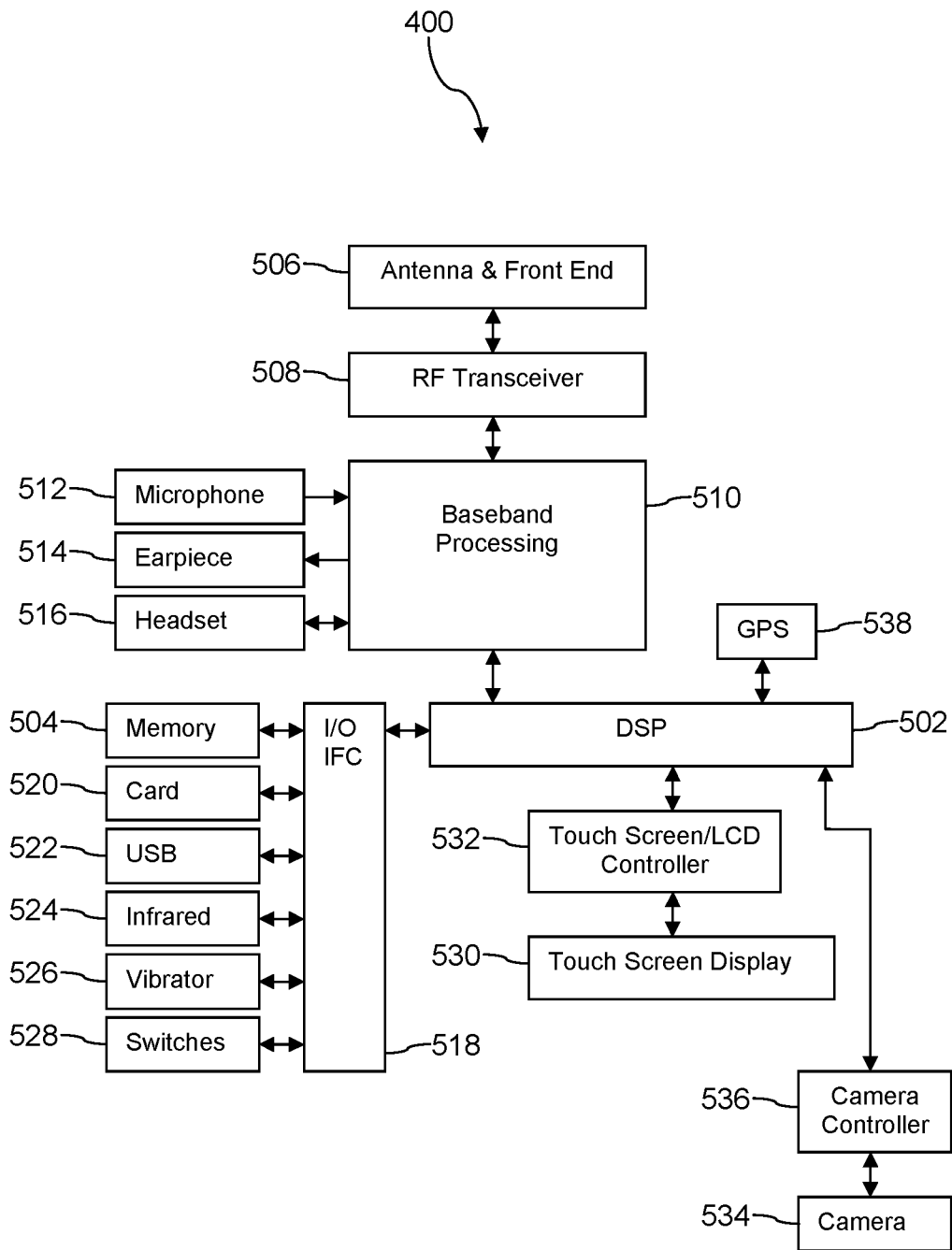
FIG. 4 is a block diagram of a hardware architecture of a mobile communication device according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
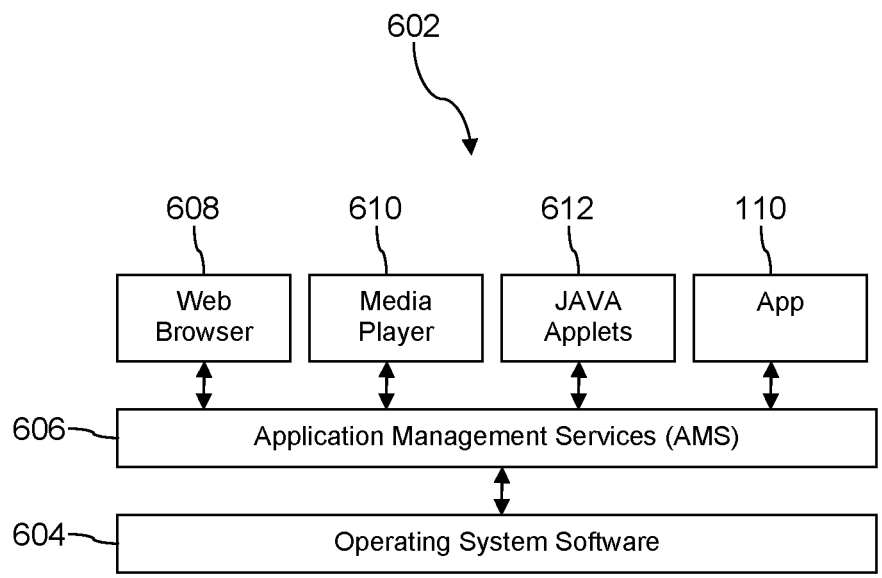
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

The third party application 614 may be dynamically downloaded and installed during a first time that the mobile communication device 400 enters the retail store 132 (e.g., any of a plurality of retails stores or other locations associated with a particular enterprise) and may be activated on subsequent entries into the retail store 132 or other location associated with the ECMA 110.

Figure 5B:
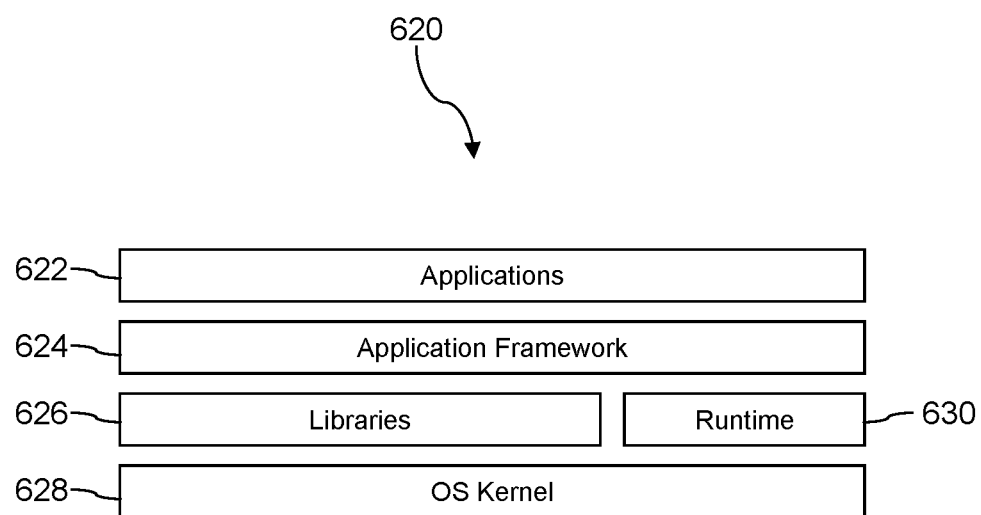
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
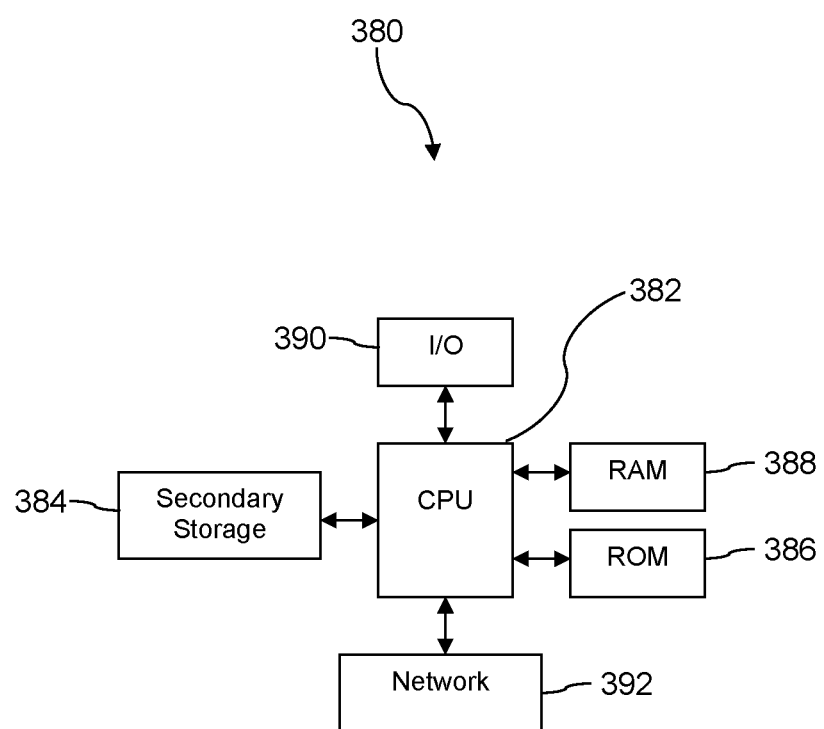
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
a cellular radio transceiver;
a short range radio transceiver;
a processor;
a non-transitory memory;
a security client application stored in the non-transitory memory that, when executed by the processor, periodically determines an inventory of installed mobile applications of the mobile communication device and transmits the periodically determined inventory to a security server application executing on a computer system external to the mobile communication device; and
an electronic commerce mobile application stored in the non-transitory memory that is used to complete payment transactions, the electronic commerce mobile application includes an embedded fraud mitigation installation protocol that causes an inventory to be collected during installation of the electronic commerce mobile application, wherein the electronic commerce mobile application, when executed by the processor:
during installation of the electronic commerce mobile application and based on the embedded fraud mitigation installation protocol:
verifies a function of the security client application a first time, and
in response to verifying the function of the security client application the first time, determines an inventory of installed mobile applications of the mobile communication device,
transmits the inventory of installed mobile applications via one of the cellular radio transceiver or the short range radio transceiver to the security server application,
detects when the mobile communication device enters a retail store or a location associated with the electronic commerce mobile application,
responsive to detecting entrance to the retail store or the location associated with the electronic commerce mobile application, transmits a request for a security risk score to the security server application executing on the computer system external to the mobile communication device,
prior to completion of a payment transaction using the electronic commerce mobile application, verifies the function of the security client application a second time,
in response to a determination that the security client application is not functioning based on verifying the function of the security client application the second time, blocks the payment transaction, and
in response to a determination that the security client application is functioning based on verifying the function of the security client application the second time and in response to a received security risk score exceeding a predefined threshold, implements an escalated level of security check during the payment transaction that includes presentation of a prompt to input user credentials during the payment transaction.

2. The mobile communication device of claim 1, wherein the electronic commerce mobile application further determines, during installation of the electronic commerce mobile application, a list of Internet Protocol (IP) addresses of short range radio access points stored in the mobile communication device and transmits the list of IP addresses of short range radio access points to the security server application.

3. The mobile communication device of claim 1, wherein the electronic commerce mobile application further determines, during installation of the electronic commerce mobile application, a list of most recently connected to Internet Protocol (IP) addresses and transmits the list of recently connected to IP addresses to the security server application.

4. The mobile communication device of claim 1, wherein the security client application detects when the short range radio transceiver establishes a communication link with a short range radio access point and transmits a message comprising an IP address of the access point to the security server application.

5. The mobile communication device of claim 1, wherein the mobile communication device is one of a mobile phone, a smart phone, a personal digital assistant (PDA), a wearable computer, a headset computer, a notebook computer, a tablet computer, or a laptop computer.

6. A method of electronic commerce using a mobile communication device, comprising:
  initiating installation of an electronic commerce mobile application on the mobile communication device, wherein the electronic commerce mobile application is used to complete payment transactions and comprises an embedded fraud mitigation installation protocol that causes an inventory to be collected during installation of the electronic commerce mobile application;
  during installation of the electronic commerce mobile application and based on the embedded fraud mitigation installation protocol:
    verifying, by the electronic commerce mobile application, a function of a security client application stored on the mobile communication device a first time, wherein the security client application periodically determines an inventory of installed mobile applications of the mobile communication device and transmits the periodically determined inventory of installed mobile applications to a security server application executing on a computer system external to the mobile communication device; and
    in response to verifying the function of the security client application the first time, determining, by the electronic commerce mobile application, an inventory of hardware components of the mobile communication device;
    transmitting, by the electronic commerce mobile application, the inventory of hardware components of the mobile communication device to the security server application;
    detecting that the mobile communication device has entered a retail store or other location associated with the electronic commerce mobile application,
    after detecting the device entering the store or other location associated with the electronic commerce mobile application, transmitting, by the electronic commerce mobile application, a request for a security risk score to the security server application;
    receiving, by the electronic commerce mobile application, a security risk score;
    prior to completion of a payment transaction using the electronic commerce mobile application, verifying, by the electronic commerce mobile application, the function of the security client application a second time;
    in response to a determination that the security client application is not functioning based on verifying the function of the security client application the second time, blocking, by the electronic mobile application, the payment transaction; and
    in response to a determination that the security client application is functioning based on verifying the function of the security client application the second time and in response to the received security risk score exceeding a predefined threshold, presenting a prompt to input user credentials during the payment transaction, where the prompt to input user credentials comprises an escalated level of transaction security.

7. The method of claim 6, further comprising, based on the received security risk score, transmitting an instruction to a point-of-sale terminal to request presentation of a personal identity.

8. The method of claim 6, further comprising determining a list of Internet Protocol (IP) addresses of short range radio access points stored in the mobile communication device and transmitting the list of IP addresses of short range radio access points to the security server application.

9. The method of claim 6, further comprising determining a list of most recently connected to Internet Protocol (IP) addresses and transmitting the list of recently connected to IP addresses to the security server application.

10. An electronic commerce security computer system, comprising:
  a mobile communication device, comprising:
    a cellular radio transceiver;
    a short range radio transceiver;
    a processor;
    a non-transitory memory;
    a security client application stored in the non-transitory memory that, when executed by the processor, periodically determines an inventory of hardware components of the mobile communication device and of installed mobile applications of the mobile communication device and transmits the periodically determined inventory to a security server application executing on a computer system external to the mobile communication device; and
    an electronic commerce mobile application stored in the non-transitory memory that is used to complete payment transactions, the electronic commerce application includes an embedded fraud mitigation installation protocol that causes an inventory to be collected during installation of the electronic commerce mobile application, wherein the electronic commerce mobile application, when executed by the processor:
      during installation of the electronic commerce mobile application and based on the embedded fraud mitigation installation protocol:
        verifies a function of the security client application a first time, and in response to verifying the function of the security client application the first time, determines an inventory of hardware components of the mobile communication device and of installed mobile applications of the mobile communication device, transmits the inventory of hardware components of the mobile communication device and of installed mobile applications via one of the cellular radio transceiver or the short range radio transceiver to the security server application, detects when the mobile communication device enters a retail store or a location associated with the electronic commerce mobile application, responsive to detecting entrance to the retail store or the location associated with the electronic commerce mobile application, transmits a request for a security risk score to the security server application executing on the computer system external to the mobile communication device, prior to completion of a payment transaction using the electronic commerce mobile application, verifies the function of the security client application a second time, in response to a determination that the security client application is not functioning based on verifying the function of the security client application the second time, blocks the payment transaction, and in response to a determination that the security client application is functioning based on verifying the function of the security client application the second time and in response to a received security risk score exceeding a predefined threshold, implements an escalated level of security check during the payment transaction that includes presentation of a prompt to input user credentials during the payment transaction.

11. The electronic security computer system of claim 10, further comprising a security server, wherein the security server comprises:
at least one processor;
at least one non-transitory memory;
a data store comprising information about the hardware components and the installed mobile applications on mobile communication devices; and
the security server application stored in the at least one non-transitory memory that, when executed by the at least one processor:
receives a message comprising the inventory of hardware components of the mobile communication device and of installed mobile applications of the mobile communication device from the electronic commerce mobile application,
after receiving the message, reads information about the hardware components and the installed mobile applications on the mobile communication device,
compares the inventory sent by the electronic commerce mobile application to the information read about the hardware components and the installed mobile applications on the mobile communication device read from the data store, and
based on the comparison, disables the electronic commerce mobile application installed on the mobile communication device to reduce fraud using the electronic commerce mobile application.

12. The electronic commerce security computer system of claim 11, wherein the security server application further receives a message that the mobile communication device is reported as lost or stolen and increases a frequency of performing a security risk calculation for the mobile communication device.

13. The electronic commerce security computer system of claim 12, wherein the security risk calculation comprises evaluating the installed mobile applications of the mobile communication device, and when the installed mobile applications of the mobile communication device correlate with a pattern of loading a mobile communication device to use as a platform for committing fraud, adding the identity of the mobile communication device to a black list of mobile communication devices.

14. The electronic commerce security computer system of claim 10, wherein the security server application further contacts a wireless communication subscriber associated with the mobile communication device through a communication channel other than through the mobile communication device.

15. The electronic commerce security computer system of claim 10, wherein the electronic commerce mobile application is disabled until a user associated with the mobile communication device contacts an issuer of the electronic commerce mobile application.

16. The electronic commerce security computer system of claim 10, wherein the electronic commerce mobile application further determines, during installation of the electronic commerce mobile application, a list of Internet Protocol (IP) addresses of short range radio access points stored in the mobile communication device and transmits the list of IP addresses of short range radio access points to the security server application.

17. The electronic commerce security computer system of claim 10, wherein the electronic commerce mobile application further determines, during installation of the electronic commerce mobile application, a list of most recently connected to Internet Protocol (IP) addresses and transmits the list of recently connected to IP addresses to the security server application.

18. The mobile communication device of claim 1, wherein installation of the electronic commerce mobile application is not completed in response to a determination that the security client application is not functioning based on the verification the first time.

* * * * *